Figure 1:
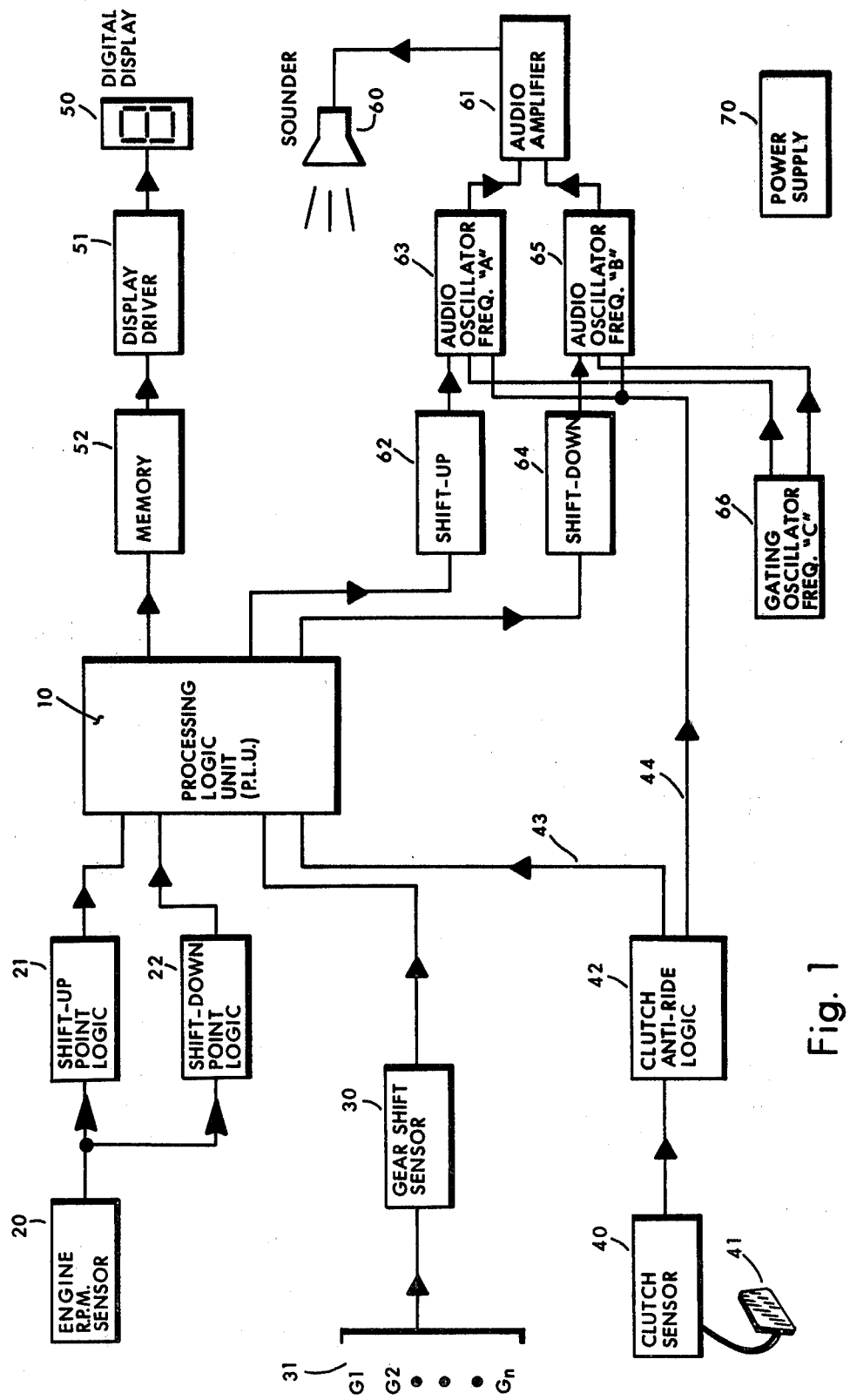

United States Patent [19]

Weber

[11] 4,150,497

[45] Apr. 24, 1979

[54] MANUAL GEARSHIFT AND CLUTCH TRAINING APPARATUS INCLUDING SENSORY INDICATION FOR MOST FAVORABLE OPERATOR CONTROL

[76] Inventor: Harold J. Weber, 20 Whitney Dr., Sherborn, Mass. 01770

[21] Appl. No.: 774,470

[22] Filed: Mar. 4, 1977

[51] Int. Cl.² .............................................. G09B 9/04
[52] U.S. Cl. .................... 35/11 R; 340/52 F
[58] Field of Search ............... 35/11 R, 11 A, 12 R, 35/12 F, 12 Q, 12 W, 48 R, 12 S; 272/14; 273/1 E, 85 R, 86 B; 340/384 R, 384 E, 52 F, 521, 692; 364/805

[56] References Cited

U.S. PATENT DOCUMENTS

| | | | |
|---|---|---|---|
| 2,288,683 | 7/1942 | Clancy | 340/52 F X |
| 2,870,548 | 1/1959 | Chedister | 35/11 R |
| 3,071,874 | 1/1963 | Chedister | 35/11 R |
| 3,266,173 | 8/1966 | Sheridan | 35/11 R |
| 3,298,010 | 1/1967 | Dubosq et al. | 340/52 F |
| 3,339,307 | 9/1967 | Floyd et al. | 273/86 B X |
| 3,427,732 | 2/1969 | Wopart | 35/48 R X |
| 3,463,866 | 8/1969 | Staples | 35/12 S |
| 3,613,263 | 10/1971 | Schuster | 35/11 R |
| 3,704,526 | 12/1972 | Frame | 35/11 R |
| 3,764,974 | 10/1973 | Melian | 340/52 F |
| 3,795,990 | 3/1974 | Quicker | 35/11 R |
| 3,896,564 | 7/1975 | Dewey et al. | 35/11 R |
| 3,936,955 | 2/1976 | Gruen et al. | 35/11 R |
| 4,058,796 | 11/1977 | Oishi et al. | 340/52 F |
| 4,093,939 | 6/1978 | Mitchell | 340/52 F |

Primary Examiner—Vance Y. Hum

[57] ABSTRACT

My invention relates to improved method and for a manual gearshift and clutch training apparatus providing for most favorable operator control through the use of sensory indicating devices. A purpose of my invention is to describe apparatus which will serve to teach the correct usage of the manual gearshifter controls as employed on vehicular machines through sensory devices capable of instructing the correct usage thereof to a novice operator. A further purpose of my invention is to provide for the teaching of the correct usage of the manual clutch controls as generally employed on vehicular machines equipped with manual gearshifter. A further purpose of my invention is to provide an attention getting sensory signal in the event of improper operation of the manual clutch. A further purpose of my invention is to provide sensory indication which will serve to tutor the experienced operator such as to effect more efficient operation of the said vehicular machine.

13 Claims, 9 Drawing Figures

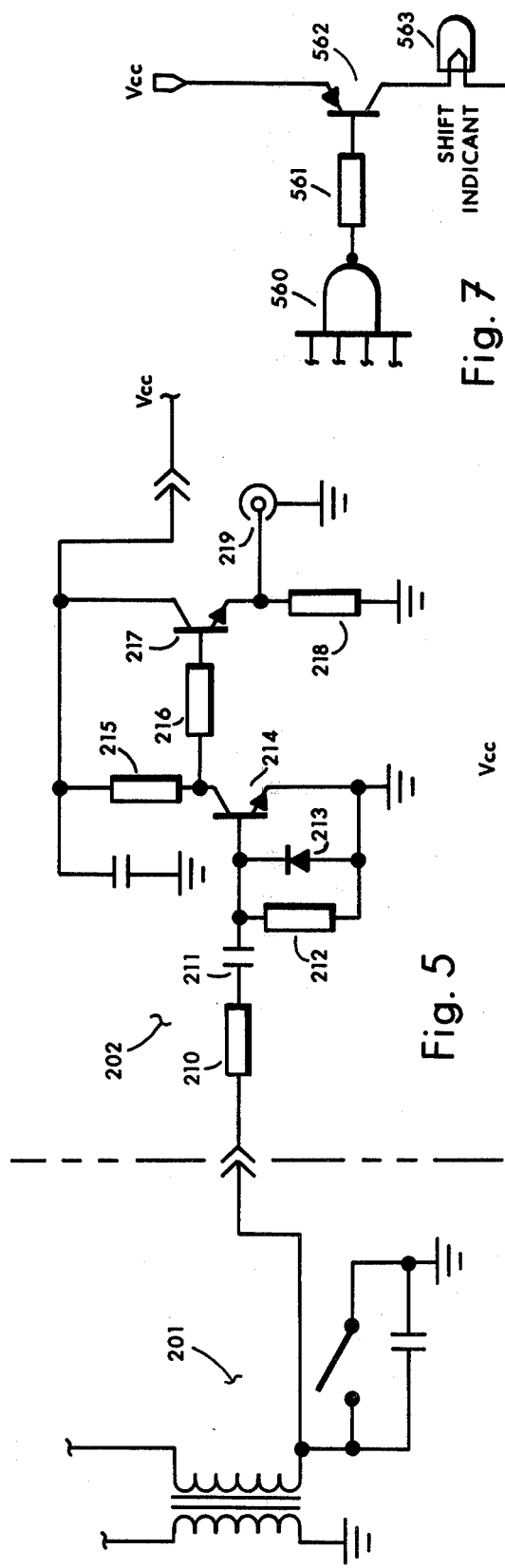
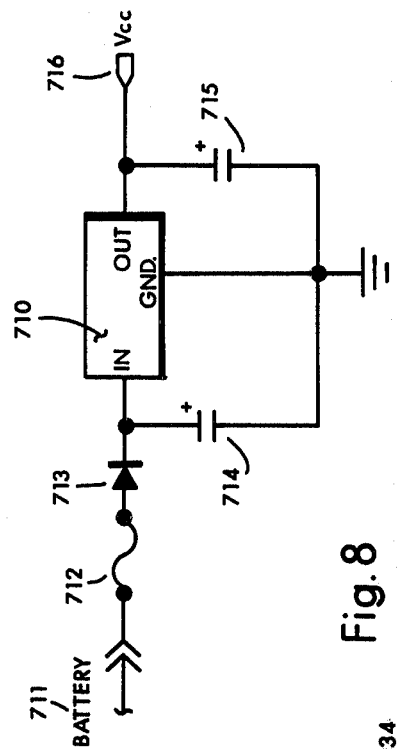
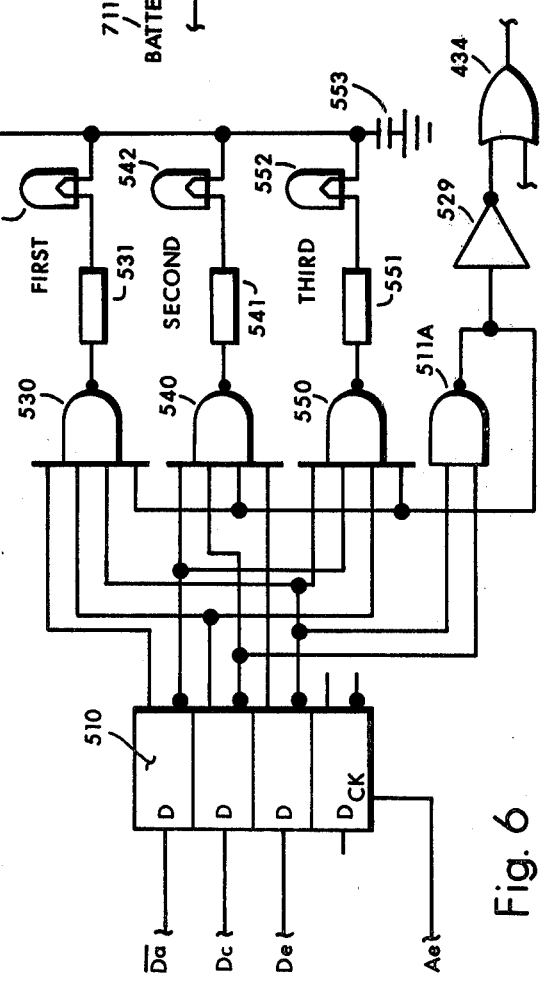

MANUAL GEARSHIFT AND CLUTCH TRAINING APPARATUS INCLUDING SENSORY INDICATION FOR MOST FAVORABLE OPERATOR CONTROL

SUMMARY

My novel invention relates to a method and means for tutoring or instructing human operators in the correct sequence of operation of the manual gearshift and manual clutch means frequently employed on motor vehicles of all types. My new invention takes on particular importance as the so-called standard, or manual gearshift transmissions regain their popularity with the general public. The generally accepted fact that manual transmissions achieve better fuel economy has influenced many purchasers to obtain vehicles using manual gearshift means when such persons have never before operated such shifters. This increase in the popularity of manual gearshifters is compounded with the coupling of such manual gear boxes with small, low output engines. The result is a combination which, if properly controlled, can lead to extraordinary fuel economy. The use of such a combination has previously been difficult for a novice operator to understand and use properly. My new invention overcomes this obstacle which tends to discourage the more widespead acceptance and better operation of such transmissions by providing the operator or driver with precise sensory indications of exactly what gear the transmission ought to be driving in or shifting into under all normal combinations of usage. Through further extension of the novelty of my invention the novice driver is also reminded of improper manual clutch operation.

The impact of my new invention is not merely limited to the usual automobile, but is shown to be an excellent training device in the use of manual gearshift and clutch means on such other vehicles as trucks, tractors, military vehicles, and any of a wide variety of other motor vehicles that may be normally expected to be operated by less than the most experienced drivers.

My instant invention is a significant improvement over known methods in that the instructive means is affixed to, or even permanently installed, in the operator's vehicle. This is to say that the instruction takes place directly in the vehicle, and under actual road conditions, as the operator will normally drive. Unlike a simulator, such direct, in situ instruction creates a new level of direct operator-vehicle interaction which can be expected to develop an operator with improved driving habits.

REFERENCE TO DRAWINGS

Figure 2:
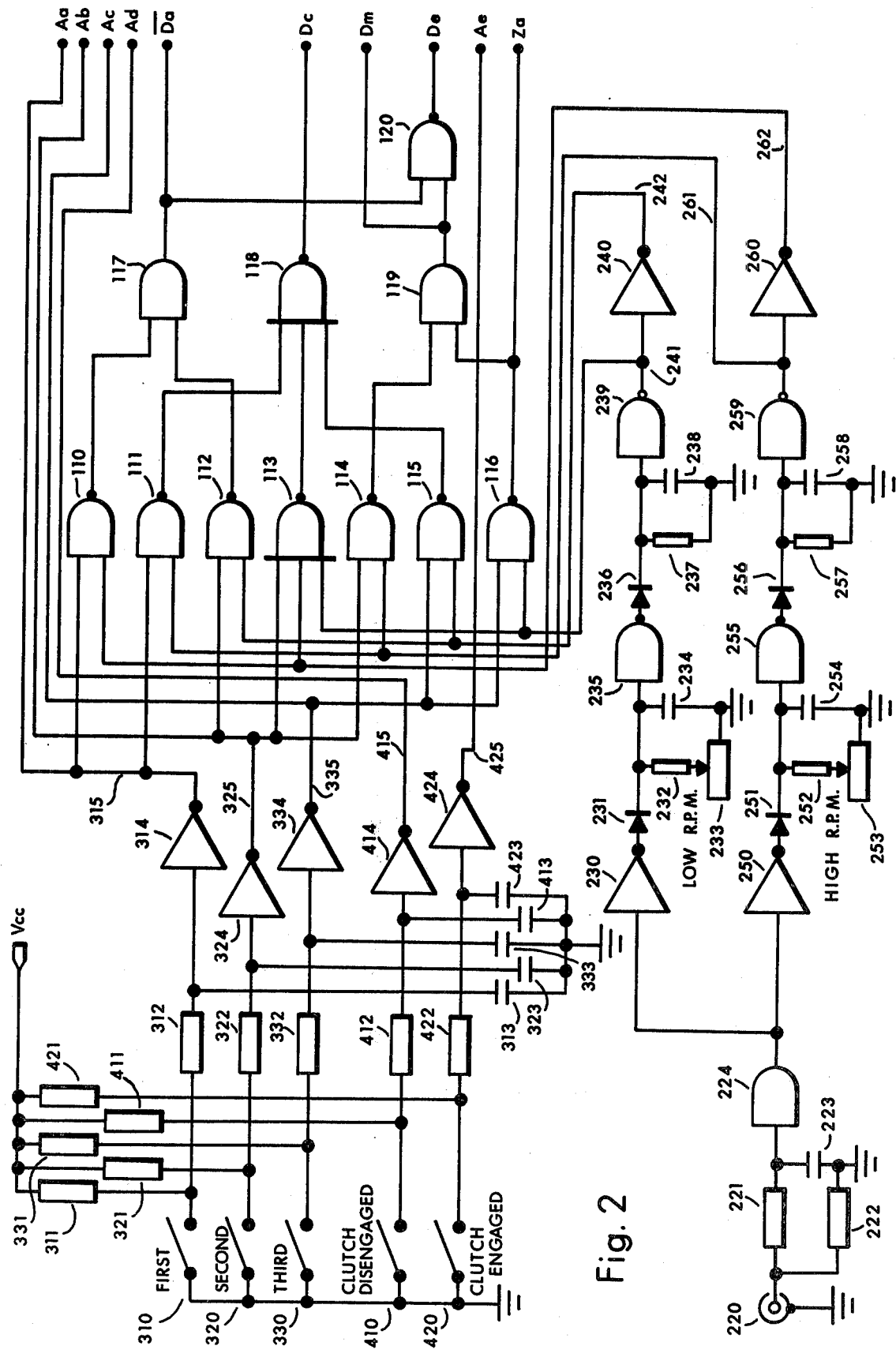
Figure 3:
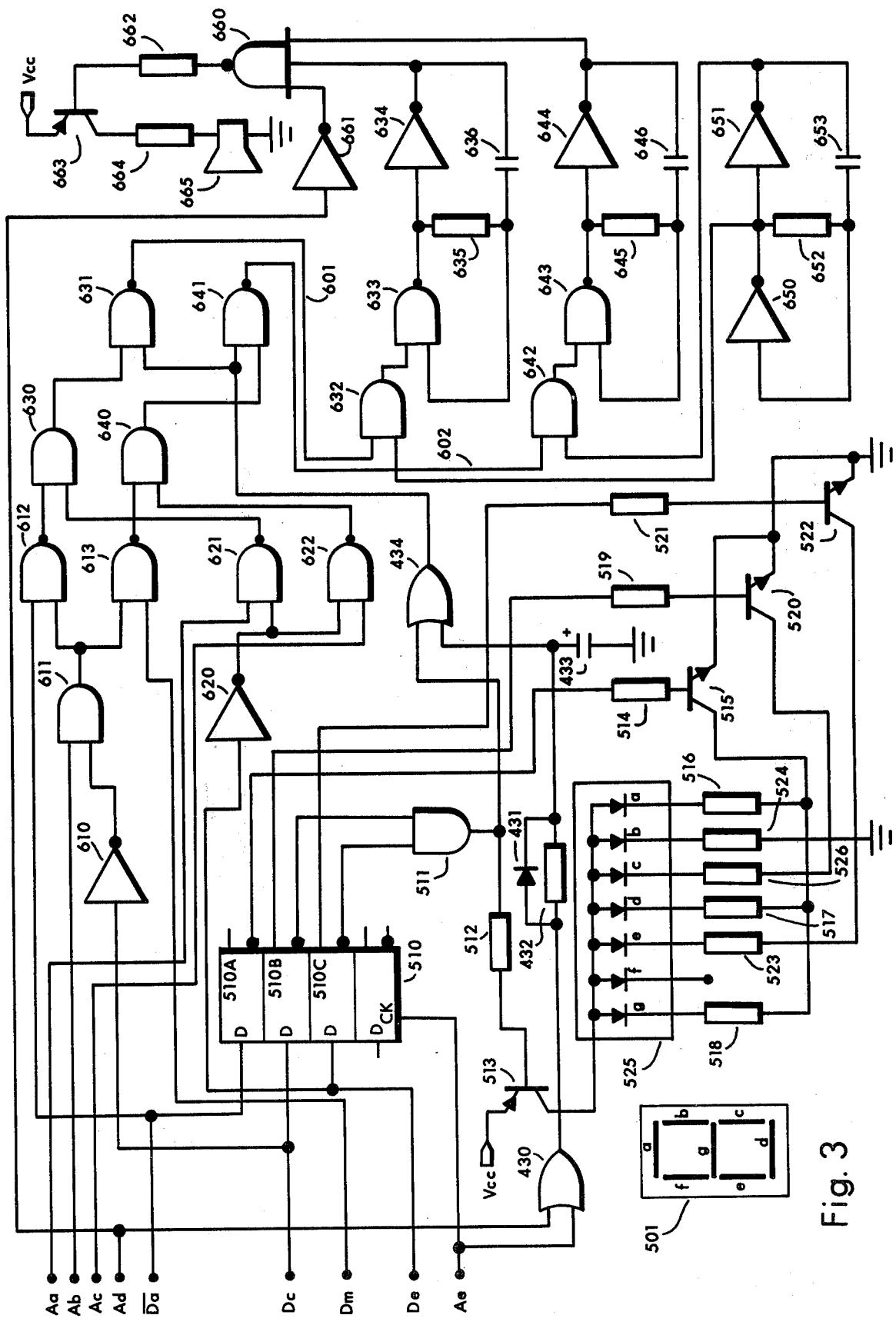
Figure 4:
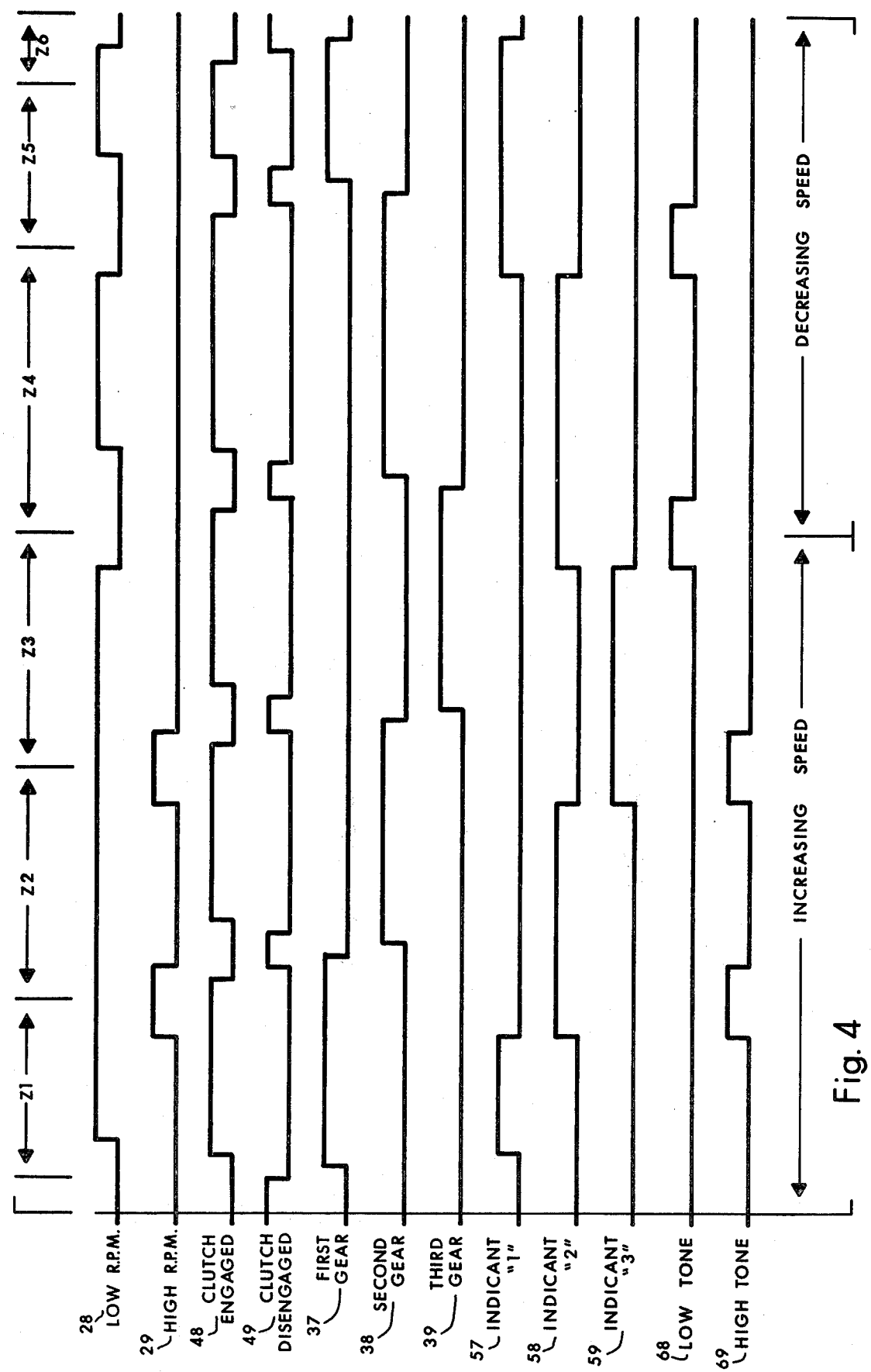
Figure 9:
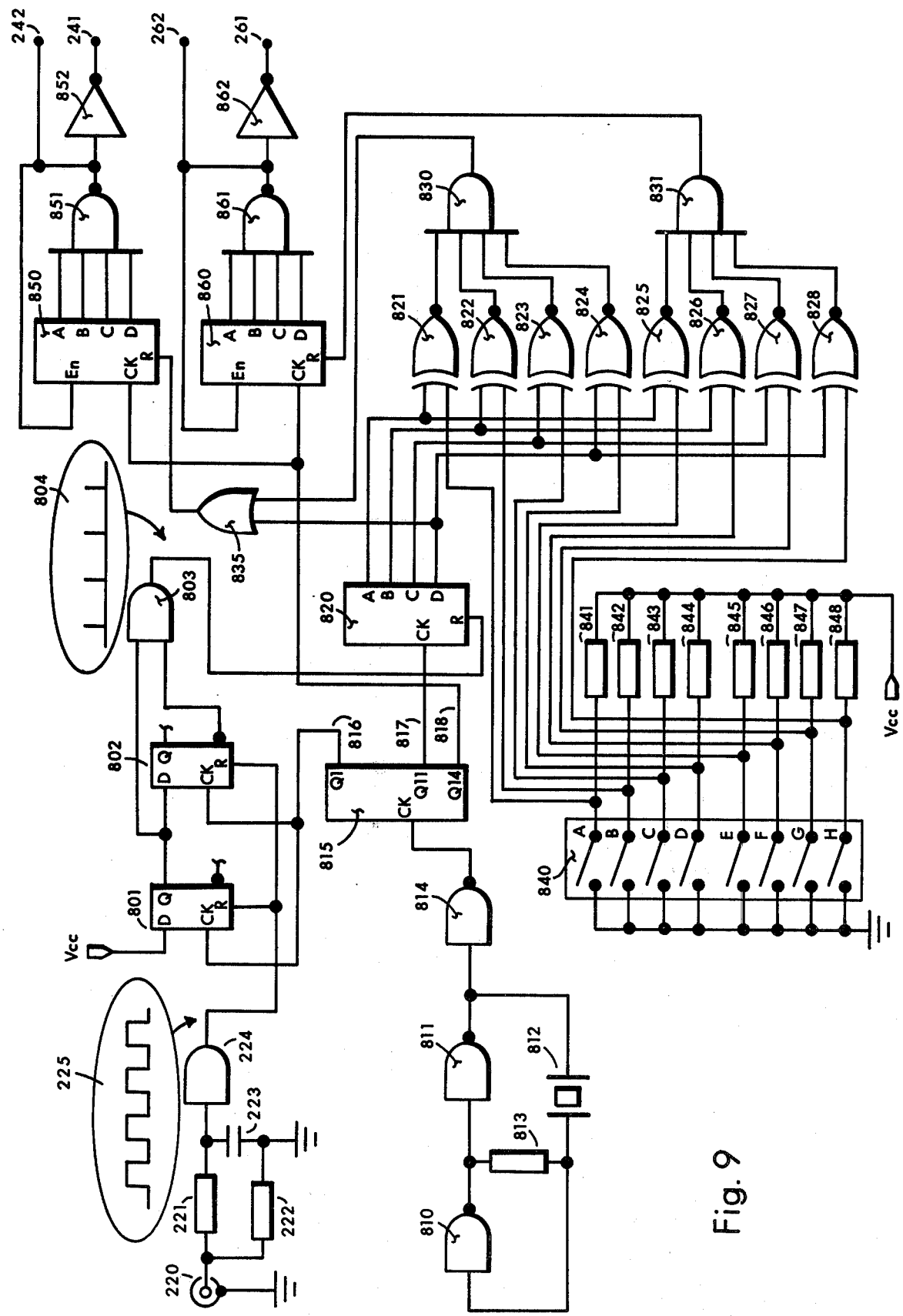

My disclosure includes six sheets of drawings containing nine figures as:

FIG. 1—Functional block diagram for the operator training apparatus,
FIG. 2—First schematic for modelled apparatus showing input sensing and logic processing means,
FIG. 3—Second schematic for modelled apparatus showing memory, visual, and audio display means,
FIG. 4—Logic timing diagram,
FIG. 5—Schematic showing modelled driving engine speed sensor interface means,
FIG. 6—Means showing application of separate visual indicant lamp means,
FIG. 7—Means for driving higher brightness shift indicant lamp means,
FIG. 8—Principal power supply means, and
FIG. 9—Shift point discrimination logic means.

SPECIFICATION

FIG. 1 is a functional block diagram of my new invention. The purpose is to provide an improved method for tutoring or instructing an operator in the proper and correct sequence of operation for a manual gearshift and clutch means as commonly utilized in motor vehicles and other machines.

My invention consists of a processing logic unit 10, herein referred to as the P.L.U., which is an arrangement of combinational circuits capable of acting upon various inputed signals and subsequently providing one or more derived output signals. One such input is developed by an engine rotational speed or R.P.M. sensor 20 which is a means so arranged as to provide a controlling signal which is proportional in form to the operational speed of the driving force or energy supplying means associated with the said manual gearshifter. In particular the sensor 10 may be means for converting the rotational shaft speed of a fuel driven engine into an electrical control signal. This said control signal obtained from sensor 20 serves to operate upon shift-up point logic circuit 21 which consists of converting circuit means operative to produce an outputed signal therefrom whenever the speed or rate of the engine or other driving means is high enough that the selection of a so called higher gear combination with less overall step-down ratio is appropriate. Additionally the said control signal obtained from sensor 20 serves to operate upon shift-down point logic circuit 22 which consists of converting circuit means operative to produce an outputed signal therefrom whenever the speed or rate of the engine or other driving means is low enough that the selection of a so called lower gear combination with greater overall step-down ratio is appropriate. The resultant signals outputed from the shift-point logic circuits 21 and 22 serve as two particular inputs to the said P.L.U. 10.

A gear shift sensor 30 is shown to provide a unique output signal which signals to the P.L.U. 10 the particular manual gear combination 31 which is engaged at any time. These engaged gears commonly consist of three to five combinations in light duty vehicles, such as for example automobiles, but may consist of many more combinations in larger, or more complex vehicular machines such as tractors, truck, and the like. The term gear shift further includes the broadest meaning as applied to a vehicular machine and, as such, shall serve to include any operator selectable drive ratio apparatus. The term gear shift further includes the broadest meaning as applied to a vehicular machine and, as such, shall serve to include any operator selectable drive ratio apparatus as, for example, belt drive, chain drive, and hydrostatic transmission means.

A clutch position sensor 40 which operates in conjunction with a manual clutch pedal 41 or like clutch control means serves to provide clutch status control signals to clutch anti-ride logic 42 and thus provide a control signal 43 to the P.L.U. 10 along with control signal 44 to other yet to be described circuit means.

The logic conditioning circuits within the P.L.U. 10 are operative to provide several outputs. One output serves to input a logic memory 52 the purpose of which is to receive and store display information under command from the P.L.U. 10. These said display information signals serve to indicate what gear group should be engaged with the manual shifter mechanisim by the operator. This display signal which is outputed from the P.L.U. 10 is logically derived by, in a general sense, comparing the gear shifter position with the instant engine R.P.M. signal. The purpose of the memory 52 is to store or hold the said display signal data, which is only valid while the said manual clutch is engaged or driving a load, and to continue to display prior information whenever the said clutch means is disengaged or decoupled.

The memory 52 outputs into a display driven means 51 which serves to drive a numeric, or digit display 50. The result is a first sensory indicant visual display of the correct gear shifter position under the imposed set of operating conditions.

Another purpose of the P.L.U. 10 is to output second sensory indicant shift up 62 and shift down 64 logic control signals. The purpose for these control signals is to provide an ungating signal to either first frequency audio oscillator 63 or second frequency audio oscillator 65.

What occurs is that, when the clutch is engaged and the P.L.U. 10 finds the gear shifter combination 31 to differ from the display output as presented to the memory 52, shift up logic 62 will be enabled if the display number 50 is higher than the gear shifter 30 position or conversely, the shift down logic 64 will be enabled if the display number 50 is lower than the gear shifter 30 position. This relation is based on the convention that gear combination 31 when in gear one is the highest step-down ratio, while higher numbers are lesser step-down ratios. In this convention, gear one is frequently referred to as low gear.

When the manual clutch 41 is fully depressed, the clutch sensor 40 signal will, through circuits in the clutch anti-ride logic 42, disable both audio oscillators 63 and 65 when the clutch 41 is fully and positively disengaged.

If the operator only partially disengages the clutch 41, which is an improper operating condition leading to premature mechanical failure of the clutch mechanisim if continued, the clutch sensor 40 will again through novel circuits in the clutch anti-ride logic 42 cause both audio oscillators 63 and 65 to be enabled. Since the audio oscillators 63 and 65 are alternately being gated by a third, or low frequency gating oscillator 66, the result will be a third sensory indicant signal occurring as a two-tone, "beep-boop", alarm signal alerting the operator he is in error.

When the clutch 41 is engaged properly, the shift-up 62 control logic, when enabled, will further enable only first frequency audio oscillator 63. Oscillator 63 is preferably of a higher frequency, for example 750 hertz, denoting a shift-up or as a second sensory indicant suggestion, a go-higher signal.

On the other hand, should the shift down 64 control logic be enabled, only second frequency audio oscillator 65 will be enabled. Oscillator 65 is preferably of a lower frequency, for example 300 hertz, denoting a shift-down or as a second sensory indicant suggestion, a go-lower signal.

The purpose of the signals are to cause the operator to develop a conditioned habit to shift to a lower gear for a lower pitched note, to shift to a higher gear for a higher pitched note, and to stay as-is should no note sound. Again since the two audio sources 63 and 65 are continually gated by third frequency gating oscillator 66 at a preferably slow, periodic rate of for example one hertz, the caused tones will be distinctive bursts. The audio outputs of the two oscillators 63 and 65 feed an audio amplifier 61 to drive a sensory audio transducer, or sounder 60.

Power for operation is provided by power supply 70, the prime source for which may be the power source in the associated vehicle, auxillary batteries, or any such sourch as might be suitable.

FIG. 2 and FIG. 3 form a more depictive schematic of an exampled embodiment of my new invention.

In FIG. 2 an engine speed or R.P.M. signal is inputed to juncture 220. The said speed signal shall be a train of pulses and will be described later as to its manner of being obtained and conditioned. The inputed speed signal at juncture 220 serves to develop a voltage across load resistor 222 which is inputed to a non-inverting buffer 224 through protective resistor 221 in conjunction with capacitor 223. Together resistor 221 and capacitor 223 also form an integrator which acts as a low pass filter and improves the input transient noise immunity of the buffer 224. The output of the said buffer 224 serves to drive each of the aforesaid shift up point logic 21 and shift down logic 22 functions shown previously in FIG. 1.

The shift up point logic function is satisfied by a low R.P.M. discriminator, or rate detector. The buffer 224 feeds pulses to inverter 230. When the input to inverter 230 is low or logic $\phi$, the output will be high or logic 1 thereby causing capacitor 234 to be charged through diode 231. When the inverter 230 input goes high, the output will go low and the output will be disconnected from capacitor 234 by reverse bias effect on diode 231. The result will be that capacitor 234 will discharge at a rate determined by the time constants introduced by parallel resistances of the seriate resistor 232 and potentiometer 233. The key to the operation of this part of my invention is that should the pulses be so frequent at the input of buffer 230 that the capacitor 234 is not permitted to discharge to the point where switching device 235 is permitted to switch, the output of inverting switching device 235 will remain low continuously. The result is that disconnect diode 236 is back biased resulting in any charge on capacitor 238 being drained to ground by resistor 237 with the thereby produced first output of inverting gain device 239 remaining high at juncture 241.

On the other hand, should the pulses into buffer 230 be less frequent, capacitor 234 will be regularly discharged to a point where switching gain device 235 will go high or logic 1 at its output, thereby charging capacitor 238 and causing device 239 to transistion so as to be low at juncture 241. The time constants associated with capacitor 234, together with resistor 232 and potentiometer 233 can be shown to be about:

$$RC = \frac{1}{2\left(\frac{PPM_{min}}{60}\right)}$$

where:

RC is the product of said capacitor 234 together with the sum of resistances 232 and 233.

$PPM_{min}$ is the LOW R.P.M. pulse rate in pulses per minute.

Operation of the shift down logic function is satisfied by circuitry similar to the said shift up logic except that it is operative at a higher pulse rate. The buffer 224 delivers rate pulses to inverter 250 which serves to charge capacitor 254 during the pulse period when the output of buffer 250 is high thus causing diode 251 to conduct. When the output of inverting buffer 250 is low, the steering diode 251 is back biased and capacitor 254 discharges through the series resistance offered by resistor 252 and potentiometer 253. As for the said low R.P.M. discriminator, if the pulse rate is recurrently too slow, capacitor 254 will discharge to the point where switching gain device 255 will transisition resulting in a high or logic 1 at the output of gate 255 causing capacitor 258 to charge through diode 256. The result will be gain device 259 will switch and its output will be low or logic $\phi$. Should the pulse rate speed up to the point where capacitor 254 can not be sufficiently discharged by resistances 252 and 253 between recharge pulses through diode 251, the output of switching device 255 will remain at a logic $\phi$ or low state resulting in the back bias of diode 256 and the subsequent discharge of capacitor 258 by resistor 257, causing the thereby produced second output of gate 259 to go to a logic 1 state. The time constants associated with capacitor 254, together with resistor 252 and potentiometer 253 can be shown to be about:

$$RC = \frac{1}{2\left(\frac{PPM_{max}}{60}\right)}$$

where:

RC is the product of the said capacitor 254 together with the sum of resistances 252 and 253.

$PPM_{max}$ is the HIGH R.P.M. pulse rate in pulses per minute.

The gear shifter positions are obtained by a switching means suitably actuated by the shifter mechanism. In the particular automobile application employing a three speed manual transmission which was used by me merely as an example of application, such switching is accomplished by three separate switch devices, such as microswitches, connected to interact with the shifter control arms on the vehicle steering column.

In the case of the said three speed transmission example, switch 310 closes only when first or low gear is engaged, switch 320 closes only when second or intermediate gear is engaged, while switch 330 closes only when third or high gear is engaged. All switches remain open or unclosed when reverse or neutral gear positions are engaged.

Additionally two more such switches were functionally located so as to be operated by the manual clutch pedal mechanisim. One switch 410 is arranged to close when the clutch pedal is fully depressed, or the clutch is in effect disengaged. The other switch 420 is arranged to close only when the clutch pedal is fully released, or in effect the clutch is engaged and the operator's foot is not operating the pedal in any manner, i.e., not so-called riding the clutch pedal.

Resistors 311, 321, 331, 411, and 421 as connected to $V_{cc}$ are pull-up resistors to establish a logic 1 or high when the respective control switches are open. Resistors 312, 322, 332, 412, and 422 together with respective capacitors 313, 323, 333, 413, and 423 form a low pass filter, integration network, or debouncing circuit to circumvent problems from noise on the associated switch lines. The inverting buffers 314, 324, 334, 414, and 424 serve to condition and invert the various switch sensor signals resulting in control line outputs 315, 325, 335, 415, and 425.

The processing logic unit 10 in my modeled apparatus makeup consists primarily of gating functions 110, 111, 112, 113, 114, 115, 116, 117, 118, 119 and 120. The purpose of this gating function portion of the P.L.U. 10 is to accomplish definitive control signals for operating the sensory indication means comprising a part of my new invention. The P.L.U. outputs in FIG. 2 are shown as $\overline{D_a}$, $D_c$, $D_e$, and $D_m$, while the various state switch interconnects are shown as $A_a$, $A_b$, $A_c$, $A_d$, and $A_e$. Line $Z_a$ is not shown to be used in this disclosure.

FIG. 3 principally shows the memory and sensory indication means comprising a part of my new invention. FIG. 3 is a continuation of the diagram in FIG. 2.

The memory consists of a logic component described commonly as a quad "D" latch 510 in my illustrative embodiment. Only three of the available four latch functions are needed in my apparatus. The $\overline{D_a}$ line is inputed to storage element 510A, the $D_c$ line is inputed to storage element 510B, and the $D_m$ line is inputed to storage element 510C. The operation of the storage memory latch 510 is to hold previous input data whenever the clutch engage switch 420 is not activated or in effect the clutch is being depressed to some degree. Whenever the clutch 41 is engaged, for example when the operator's foot is off the clutch pedal 41 in an automobile, the outputs of the memory 510 will follow the respective inputs. This is an important part of the novelty of my invention as this memory permits sensory shift information to be displayed, but prevents the erroneous information which may occur when the clutch 41 is disengaged and the data presented the P.L.U. 10 is invalid.

A visual first sensory indicant display in the form of a seven segment single digit display is used in my model for purpose of illustration. A large seven segment display 501 is connected so as to present the three digits 1 - 2 - 3 needed in my particular embodiment shown for a three speed transmission. With a seven segment type display, the said indicia numbers require the following segment activation:

1—b, c
2—a, b, d, e, g
3—a, b, c, d, g

Since in this particular embodiment "segment f" is not used for any desired number, it is left unconnected. In the display 525, segments a, d, and g are tied together, being driven through respective current limit resistors 516, 517, and 518 from drive transistor 515 which is in turn driven through base resistor 514 from storage latch 510A. Segment "b" is grounded, as it is needed in the generation of each of the desired digits. Segment "c" is driven through limit resistor 526 from drive transistor 520, which in turn is operative by the signal arriving from latch 510B through base resistor 519. Segment "e" is driven through ballast resistor 523 from drive transistor 522, which in turn is operative by the signal arriving from latch 510C.

Display turn on is accomplished by AND gate 511, which turns on transistor 513 through base resistor 512 when a low or logic $\phi$ occurs on either input of gate 511 from either memory cell 510B or 510C. This advantageous aspect of my new invention prevents any visual digit display unless the data is valid. In other words, if the manual shifter mechanism is in neutral, no display will occur.

Two audio oscillators are shown, the intent being to provide a secondary indication for tutoring the operator in correct manual gear shift point operation and a third sensory indication for tutoring correct manual clutch usage.

A higher note, or first frequency, oscillator consisting of gain devices 633 and 634, together with resistor 635 and capacitor 636 forms a particular class of relaxation oscillator. Similarly, a lower note, or second frequency, oscillator consisting of gain devices 643 and 644 form a multivibrator at a lower frequency. The outputs of these said higher note and lower note oscillators are inputed into AND gate 660. The purpose of the AND gate 660 is twofold, first to sum or mix the first and second frequency audio notes and secondly to shut off the audio note when the manual clutch 41 is fully depressed as controlled by the $A_d$ logic line through inverter 661. Gate 660 drives a transducer driver transistor 663 through base resistor 662. The acoustic transducer, as for example a small radio loudspeaker, is connected to the transistor collector through a volume limiting resistor 664.

A third frequency sub-audio astable multivibrator operating at for example one hertz is shown to be formed by gain devices 650 and 651, together with resistance 652 and timing condensor 653. Complementary outputs from this said third frequency oscillator gates the said first frequency and second frequency audio oscillator in an alternate fashion through control gates 632 and 642 respectively.

Control gates 631 and 641 each have one input commonly derived from OR gate 434. This OR gate function serves two functions first of which is to provide a warning of improper clutch operation as for example, riding the clutch with the foot and partial pedal release. Gate 430 receives a logic 1 signal from the sensors 410 or 420 via control lines $A_d$ or $A_e$ whenever proper clutch operation occurs. However, improper operation causes both inputs to OR gate 430 to go low or logic $\phi$, resulting in a logic $\phi$ at the output. This causes capacitor 433 to discharge through resistor 432, assuming the capacitor 433 was previously charged through diode 431 when the clutch was either fully extended or depressed. The R-C time constant of capacitor 433 and resistor 432 is such that normal clutch operation time, for example several seconds, will not decay capacitor 433 enough to switch the operative input of OR gate 434. The second function of gate 434 is to lock out the aforesaid action when the gear shifter mechanisim is in neutral, from the signal obtained from gate 511. Should the output of 434 go logic $\phi$, or low, NAND gates 631 and 641 will output logic 1, or high, resulting in both audio note oscillators alternatingly operating in a "beep-boop" two tone manner. This tells the vehicle operator he is improperly operating the manual clutch.

Buffers 610 and 620 together with gates 611, 612, 613, 621, 622, 630, and 640 comprise the control logic to activate either audio note oscillator so as to cause a higher, or first frequency, "beep-beep" note to occur when the operator should shift into a higher gear and, conversely, a lower, or second frequency, "boop-boop" note when a lower gear shift is called for.

FIG. 4 shows the waveform or timing diagram associated with the particular embodiment of my new invention which I have described within the preceding paragraphs. This diagram serves to illustrate the interaction of different portions of my invention allowing those persons skilled in the art to make extensions of the principles of my invention to suit other more particular applications. In FIG. 4, the arrangement is such that from left to right represents increasing speed in zones Z1, Z2, and Z3 whereas decreasing speed is shown in zone Z4, Z5 and Z6. The low R.P.M. sequence 28 is shown low when the R.P.M. is less than $RPM_{min}$ and high when the R.P.M. is above $RPM_{min}$. The high R.P.M. sequence 29 is shown high when the R.P.M. is less than $RPM_{max}$ and high when RPM is above $RPM_{max}$. Clutch engagement 48 is shown as a high when the clutch is engaged, or driving. Clutch disengagement 49 is shown as a high when the clutch is disengaged. First gear 37 is shown as a high when the manual shifter is in first, or low gear. Second gear 38 is shown as a high when the shifter is in second, or intermediate gear. Third gear 39 is shown as a high when the shifter is in third, or high gear.

Indicant "1" 57 is shown to be high when the sensory visual display shows a digit one meaning the operator should have or put the gear shifters 37, 38, or 39 in the matching position. Indicant "2" 58 and indicant "3" 59 operate in a like manner showing the operator what gear shoud be engaged under the particular shown operating conditions.

The second frequency, or low tone 68 and first frequency, or high tone 69 lines indicate by a high condition when a lower note or a higher note audio tone is sounded to alert the operator of the need to downshift or upshift the gear changer means.

The six zones Z1 through Z6 show the following:
Z1—neutral to first gear,
Z2—first gear to second gear,
Z3—second gear to third gear,
Z4—third gear to second gear,
Z5—second gear to first gear, and
Z6—first gear to neutral.

The same principles of operation can be extended to many more than three gear levels, for example four or five speed automotive transmissions or even more positions in trucks and tractor machines.

FIG. 5 shows a particular embodiment for interfacing the circuit shown in FIG. 2 with a typical internal combustion type engine ignition system. Although it is general practice that newer systems are going solid state or to transistorized ignitions, it is not a purpose of my new invention to particularly call for how the R.P.M. sense information is obtained, but rather I wish to show that some means for such R.P.M. sensing shall be provided. In FIG. 5 the typical vehicular ignition system 201 is coupled to a transistor 214 through current limit resistor 210 and direct current blocking capacitor 211. A base resistor 212 establishes an off-state in the transistor 214 in the absence of signals while clamp diode 213 prevents excessive reverse base to emitter voltage in transistor 214. When pulses are inputed, the collector of transistor 214 will draw current pulses through not only collector pullup resistor 215 but also through base resistor 216 into the base of emitter follower transistor stage 217, the result of which is to deliver current pulses through the emitter of 217 and thus through emitter resistor 218. The resulting voltage pulses developed across resistor 218 are delivered by terminal 219 to the corresponding input terminal 220 in FIG. 2.

FIG. 6 shows a variation over the display circuit portions of FIG. 3. The purpose of this alternate connection is to provide for operation of three separate indicant lamps 532 for first, 542 for second, and 552 for third. The circuit portions in FIG. 6 replace elements 501, 512, 513, 514, 515, 516, 517, 518, 519, 520, 521, 522, 523, 524, 525, and 526 in FIG. 3. Instead in FIG. 6 the output of the memory latch 510 drives three 4-input NAND gates 530, 540, and 550. Gate 530 decodes "first" gear indication resulting in the turning on of indicator lamp 532 through ballast resistance 531. Gate 540 decodes "second" gear indication resulting in the turning on of indicator lamp 542 through ballast resistance 541. Gate 550 decodes "third" gear indication resulting in the turning on of indicator lamp 552 through ballast resistance 551. A 2-input NAND gate 511A serves to blank all indications when the gear shifter is in neutral, while also controlling the clutch warning OR gate 434 through an inverter 529. The purpose for gate 434 is the same as said for FIG. 3.

FIG. 7 is some refinement of FIG. 6 showing how a current boost transistor 562 may be employed to operate a larger shift indicant lamp 563. As shown, gate 560 and limit resistor 561 in FIG. 7 replace like gates and resistors 530, 531, 540, 541, and 550, 551 in FIG. 6.

FIG. 8 is illustrative of one form the power supply for other portions of my new invention may take. This supply is of particular interest in vehicular applications. The vehicle battery 711 through a fuse 712 and blocking diode 713 powers a unit regulator or integrated circuit control device 710. A capacitor 714 filters the incoming D.C. battery line for noise, while capacitor 715 filters or further decouples the regulator 710 output 716 which supplies $V_{cc}$ power to all other circuit connections. As is usual practice with digital schematics, all non-signals connections are not shown but are intended to be properly connected either to $V_{cc}$ or ground to make the respective digital device operative in proper form. Typically the battery connection 711 is made through the vehicle ignition or main switch. In a vehicle with a twelve volt battery system, a regulator supplying a $V_{cc}$ of about 8 volts has been found suitable.

FIG. 9 shows a preferred all digital shift point logic means which serves the function of the shift up point logic 21 and shift down point logic 22 shown in FIG. 1. The digital circuitry shown in FIG. 9 replaces the analog circuit portions of FIG. 2 represented by 230, 231, 232, 233, 234, 235, 236, 237, 238, 239, 240, 250, 251, 252, 253, 254, 255, 256, 257, 258, 259, and 260. The improvement offered by the alternative means in FIG. 9 over that shown in FIG. 2 is the elimination of the dependance on capacitor charging circuits 234, 254 and the relative instabilities of variable resistances as represented by potentiometers 233 and 253.

In FIG. 9 an engine speed or R.P.M. signal is inputed to juncture 220. The said speed signal inputed at juncture 220 serves to develop a voltage across resistor 222 which is inputed to a noninverting buffer 224 through protective resistor 221 in conjunction with capacitor 223. Together resistor 221 and capacitor 223 also form an integrator which acts as a low pass filter and improves the input transient noise immunity of buffer 224.

An oscillator, or clock, comprising gain devices 810 and 811 together with a mechanical resonant device, for example a quartz piezoelectric crystal 812 and a bias resistance 813. Merely as an example in my modelled apparatus the said oscillator operates at a frequency of 1,146,880 hertz. The clock waveform is conditioned by inverting buffer 814 to drive the CLOCK input of a fourteen bit, or fourteen stage, counter or divider circuit 815. The result is a 573,440 hertz signal at the output of the first stage Q1, a 560 hertz signal at the output of the eleventh stage or Q11, and a 70 hertz signal at the output of the fourteenth stage or Q14 on the said divider function 815.

The said Q1 output from divider 815 drives the CLOCK inputs of type "D" flip-flops 801 and 802, while the RESET lines on flip-flops 801 and 802 are driven by the speed related pulses delivered from buffer 224. The two bistable elements 801 and 802 are operative to produce ONE single output pulse 804, the duration or period of which is equal to the period of one cycle of the frequency on line 816, for each speed pulse 225 delivered to the reset line. This circuit portion is oftimes referred to as a resynchronizer in the field of digital systems.

This output pulse 804 so derived serves to RESET a second four bit counter or divider 820. Concurrently the CLOCK drive for the divider 820 is obtained from the Q11 line 817 on divider 815, which is at the aforesaid rate of 560 hertz. With the given exampled values for the clock and counter combinations, a method has been established for obtaining the necessary outputs from counter 820 which can be decoded and utilized to effect speed discrimination.

Solely for purpose of illustration, let the desired shift down point be 800 R.P.M., and the desired shift up point be 2,240 R.P.M. for a 6 cylinder automotive engine. This results in a speed pulse train 225 rate of:

$$F_L = 3 \ (800/60) \ \text{hertz} = 40 \ \text{hertz}$$

for the shift down point, and $$F_H = 3 \ (2240/60) \ \text{hertz} = 112 \ \text{hertz}$$

for the shift up point. What this means is that, if counter 820 CLOCK is being fed by a said 560 hertz rate while the counter 820 RESET is being fed by the rates shown in the preceding formulae, the counter 820 will count up to fourteen before being reset when the engine speed is 800 R.P.M., while it will count to only five before being reset if the speed is 2,240 R.P.M. The decoding of the respective counter 820 outputs are in my model shown to be accomplished by EXCLUSIVE-OR gates 821 through 828 inclusive. The truth table for this particular gate function is shown by:

| INPUT | | OUTPUT |
|---|---|---|
| A | B | J |
| 0 | 0 | 0 |
| 1 | 0 | 1 |
| 0 | 1 | 1 |
| 1 | 1 | 0 |

The decoding selection is accomplished by switch group 840 together with associated pull-up resistors 841 through 848 inclusive. A switch CLOSURE represents a logic $\phi$ or low in my shown form. To decode a "5" and "14" from counter 820, switch 840 is arranged as:

| 840- A | B | C | D | E | F | G | H |
|---|---|---|---|---|---|---|---|
| 1 | 0 | 1 | 0 | 0 | 1 | 1 | 1 | resulting in a decoded "5" at the output of NAND gate 830 and a decoded "14" at the output of NAND gate 831.

Gate 830 serves to reset counter 850 at a count of "5" by means of OR gate also for all counts above "7". Gate 831 serves to reset counter 860 at a count of "14".

The two counters 850 and 860 are, in effect, delay or hold-off circuits. The clock input is 70 hertz or about 14.3 milliseconds. Therefore it takes about 228 milliseconds before a shift down signal will result from NAND gate 851, or a shift up signal will result from NAND gate 852 after the respective RESET lines are disabled by respective NAND gates 830 and 831.

The outputs from the shift point discrimination logic shown in FIG. 9 are FOUR lines 241, 242, 261, and 262 which connect into the respective logic lines 241, 242, 261, and 262 shown in FIG. 2.

Although I have described my new invention in terms of a particular preferred embodiment thereof, which is set forth in some detail, it should be understood that this is by way of illustration only to enable a person of average skill in the art to be able to duplicate my invention for purposes of experimentation. This illustrative manner of description in my specification and drawings shall not necessarily limit the scope or the application thereto. Alternate embodiments and operating techniques will become apparent to those skilled in the art in view of my disclosure and, accordingly, it is contemplated that modifications can be made in my described apparatus without departing from the spirit of the described invention.

The scope and intent of my new invention includes that modification which may singularly include the use of the visual sensory display means or the auditory sensory translation means alone.

The scope and intent of my new invention includes that modification which may include the use of the disclosed methods independently as a manual gearshift or a manual clutch tutoring means.

My invention shall include within its scope any manner of switching or sensing means suited for determining the actual manual gear combination which is engaged.

My modelled invention is shown to be operative with a three speed manual transmission gearshifter means but in no way shall this infer any limitation of the spirit of my new invention regarding the application of my invention to any other plurality of manual gear combination means.

My invention is shown for illustrative purposes for use with a relatively common six cylinder internal combustion engine but in no way shall this construe it's limitation to engines of like type with different cylinder combinations, nor engines or driving means of other classes of operation exampled by but not solely limited to rotary engines, turbines, steam driven engines, and a broad class of electrically motorized driving means.

My invention relates to an engine R.P.M. sensor 20 as an exampled means for achieving recognition of the operational parameters of the driving engine, but the scope of my invention shall include any means suited to translate the operational boundaries of the driving engine means into suitable control signals.

My invention relates to, in particular in the processing logic unit, to a particular application of digital switching elements to achieve the necessary output control signals from the available combination of input control signals. The scope and intent of my invention shall include any electronic or electromechanical signal combinational means yielding the same effective results.

A list of principal components employed by me in the course of illustrating my modelled invention in this disclosure is presented:

| | |
|---|---|
| integrated circuit 117,119,224,511,630, 632, 640, 642 | 1/4CD4081 |
| integrated circuit 430,434,835 | 1/4 CD4071 |
| integrated circuit 110,111,112,114,115,116, 120,235,239,255,259,511A,612,613,621, 622,631,633,641,643,810,811,841 | 1/4 CD4011 |
| integrated circuit 821,822,823,824, 825,826,827,828 | 1/4 CD4077 |
| integrated circuit 815 | CD4020 |
| integrated circuit 230,240,250,260,314, 324,334,414,424,620,634,644,650, 651,852,862 | 1/6 CD4069 |
| integrated circuit 820 | CD4029 |
| integrated circuit 850,860 | 1/2 CD4520 |
| integrated circuit 113,118,660 | 1/3 CD4023 |
| integrated circuit 801,802 | 1/2 CD4013 |
| integrated circuit 530,540,550,560 | 1/2 CD4012 |
| integrated circuit 510 | CD4042 |
| integrated circuit 830,831 | 1/2 CD4082 |
| regulator integrated circuit 710 | μA-7808 |
| transistor 214,217,515,520,522 | 2N5172 |
| transistor 513,562,663 | 2N6076 |
| diode 213,231,236,251,256,431 | 1N914 |
| diode 713 | 1N4002 |
| resistor 311,321,331,411,421 | |
| resistor 312,322,332,412,422,841, 842,843,844,845,846,847,848 | 5,600 ohm |
| resistor 232 | 330-K ohm |
| resistor 237,257 | 1.8 megohm |
| resistor 252 | 220-K ohm |
| resistor 221,512 | 1,000 ohm |
| resistor 222,514,519,521 | 4,700 ohm |
| resistor 432 | 470-K ohm |
| resistor 516,517,518,523,524,526 | 220 ohm |
| resistor 635 | 150-K ohm |
| resistor 645 | 100-K ohm |
| resistor 652 | 1 megohm |
| resistor 662 | 1,800 ohm |
| resistor 664 | 18 ohm |
| resistor 813 | 39-K ohm |
| potentiometer 233, 253 | 100-K ohm |
| piezoelectric resonator crystal 812 | 1,146,880 hertz |
| capacitor 313,323,333,413,423 | 10 nanofarad |
| capacitor 223 | 1 nanofarad |
| capacitor 234,238,258 | 50 nanofarad |
| capacitor 254,646 | 20 nanofarad |
| capacitor 433 | 2.2 microfarad |
| capacitor 636 | 5 nanofarad |
| capacitor 653 | 470 nanofarad |
| capacitor 211 | 4.7 nanofarad |
| capacitor 714 | 4.7 microfarad |
| capacitor 715 | 10 microfarad |
| display 525 | FD-567 |

This list shall not be construed as being restrictive of the intent or scope of my new invention, but rather is provided merely as a recommendation of tried combinations for the convienence of those skilled in the art who may care to attempt to experimentally duplicate my invention.

In the practical form as I have modelled this new invention, the principal electronic portions are located on a circuit board about four by six inches locateded under the dashboard of the vehicle, with the display 501 remotely located and positioned so as to be readily viewable by the operator as for example within the vehicle's instrument cluster assemblage.

What I claim is:

1. A vehicular machine manual gearshift and clutch training apparatus including sensory indicator means providing admonition for the most favorable operator control thereof, comprising in combination:

a. An operator controlled vehicular machine apparatus consisting of at least:

A driving engine means, including an output means therefrom;

A clutch means including an input coupled to said driving means output, wherein said clutch means provides, at an output therefrom, at least a state of engagement and a state of disengagement of said output from said input by means under the control of an operator;

A transmission gearing means including an input coupled to said clutch means output, wherein said transmission means provides, at an output therefrom, at least two combinations of gearing together with a means for operably selecting therebetwixt by means under the control of the operator;

Propulsion means coupled to said transmission means output, wherein said propulsion means is operative to enable the mobility of the said vehicular machine;

b. A speed sensing means coupled to said driving engine means operative to provide a bounding signal pattern output therefrom, wherein the definition of such signal is constrained by the pre-established best operational performance range of the said driving engine means;

c. A transmission gear combination sensing means operative to provide a unique signal pattern output therefrom for each available combination of transmission gearing ratios;

d. A clutch sensing means operative to provide a unique signal pattern output therefrom for at least one condition of engagement, partial engagement, and disengagement of the said clutch means;

e. A processing logic unit means including a plurality of inputs thereto which are operatively connected to the said speed sensing signal output, said transmission gear combination sensing signal output, and said clutch sensing signal output wherein said logic unit is operative to provide at least one derived conditional output signal therefrom the logic combination of which is dependent upon the particular pattern of input signals provided thereto by the said sensing means;

f. A first sensory indicant means operative by at least one signal derived from the said processing logic unit output to provide for the operator an indication of the correct gearing combination which should be engaged;

g. A second sensory indicant means operative by at least one signal derived from the said processing logic unit output to provide for the operator a distinctive indication of the impending need for gearing readjustment;

h. A third sensory indicant means operative by at least one signal derived from the said processing logic unit output to provide for the operator a distinctive indication of the abusive operation of the clutch means.

2. The training apparatus of claim 1 wherein the said speed sensing means is operative to provide a repetitive pulse train the rate of which is proportional to the driving engine speed and further wherein said pulse train is conditioned by means to to provide at least one bounding signal output therefrom which is indicative of the best operational performance range of the said driving engine means.

3. The training apparatus of claim 2 including an internal clock wherein the said bounding signal pattern is effected by combinational logic means comparing the rate of the said internal clock oscillator with pulse signals provided by the said driving engine speed sensing means.

4. The training apparatus of claim 1 wherein said transmission gearing means includes a control arm means and said gear combination sensing means includes electrical switch device means coupled to the control arm means controlling the selection of the said gear combinations for the purpose of effecting, at an output therefrom, electrical control signals indicating the instant gear engagement combination.

5. The training apparatus of claim 1 wherein the said clutch sensing means includes clutch engagement control means and electrical switch means actuated by the said clutch engagement control means for the purpose of effecting at an output therefrom, at least one condition indicative electrical control signal.

6. The training apparatus of claim 1 wherein the said processing logic unit comprises an operative combination of digital integrated circuits including plurality of control inputs thereto which serves to provide at least one output control signal therefrom which is conditionally dependent upon the state of the said plural input control signals.

7. The training apparatus of claim 1 wherein the said first sensory indicant means includes a visual display numeral indicating means for the purpose of tutoring the operator as to the optimum transmission gear ratio to be engaged.

8. The training apparatus of claim 1 wherein the said second sensory indicant means provides an auditory tone of higher pitch when a gearshift reducing the gearing ratio should be made and further that a tone of lower pitch is provided when a gearshift increasing the gearing ratio should be made.

9. The training apparatus of claim 1 wherein the said third sensory indicant means provides a distinctive auditory sensory signal alternating between a tone of higher pitch and a tone of lower pitch at a subaudible rate for the purpose of indicating, in a tutorial manner, the occurance of improper operation of the said manual clutch means.

10. The training apparatus of claim 1 wherein the said bounding signal pattern is effected by frequency rate discrimination circuits employing circuits that produce one logic condition at a first output therefrom when the driving engine speed is below prescribed limits and a logic complement condition at a first output therefrom when the driving engine speed is above prescribed limits; whereas further the circuits produce one logic condition at a second output therefrom when the driving engine speed is below prescribed limits and a logic complement condition at a second output therefrom when the driving engine speed is above prescribed limits, whereby the said first and second rate discriminator circuit outputs establish distinctive control signal outputs at the lower and upper limits of the said driving engine best operational performance range.

11. The training apparatus of claim 1 wherein the said first sensory indicant means includes a visual display including memory storage means to hold and provide correct information to the display even when the said manual clutch is disengaged thereby causing invalid signal conditions to output from the said processing logic unit.

12. The training apparatus of claim 1 wherein the said gearshift tutoring said first and second sensory indicant means are disabled when the presented tutoring sensory signal condition is invalid due to the particular combination of the several said sensing means signal patterns provided at the input of the said processing logic unit.

13. A vehicular machine manual gearshift and clutch training apparatus including sensory indicator means for most favorable operator control thereof, comprising in combination:
a. A vehicular machine apparatus consisting of in the main:
   A driving engine means including an output means therefrom;
   A manual clutch means coupled to said driving engine means, including an output therefrom;
   A transmission means coupled to said clutch means, including a plurality of gear combination means wheich may be effected by an operator manipulated control means, said transmission including an output therefrom;
   A load means coupled to said transmission means;
b. A bounding signal generative means coupled to said driving engine means which is operative to produce an output therefrom which is indicative of the best operational performance range of the said driving engine means;
c. A transmission gear combination sensing means operative to provide an output signal therefrom which is uniquely indicative for each operator selected gear ratio combination;
d. A clutch position sensing means operative to provide at an output therefrom a signal which is indicative of the condition of at least one state of clutch engagement, disengagement, or partial engagement;
e. A processing logic unit whereby a plurality of inputs are provided which are coupled to at least the said bounding signal output, the said transmission gear combination signal output, and the said clutch position signal output, whereby the said inputs are combined in the processing logic unit so as to produce at least one output signal which is uniquely indicative of the plural input combinations;
f. At least one sensory indicant means coupled to the said processing logic unit output, whereby the said indicant operates to provide the operator with tutorial direction as to the optimum operation of the gearshift and clutch, being part of the combined apparatus comprising the said vehicular machine.

* * * * *